Nov. 26, 1929.  G. W. FROST  1,737,229

SWITCH FOR SYSTEMS OF AUTOMOTIVE SAFETY SIGNALING

Filed July 19, 1926  3 Sheets-Sheet 1

Inventor:
George W. Frost
By
Attorneys

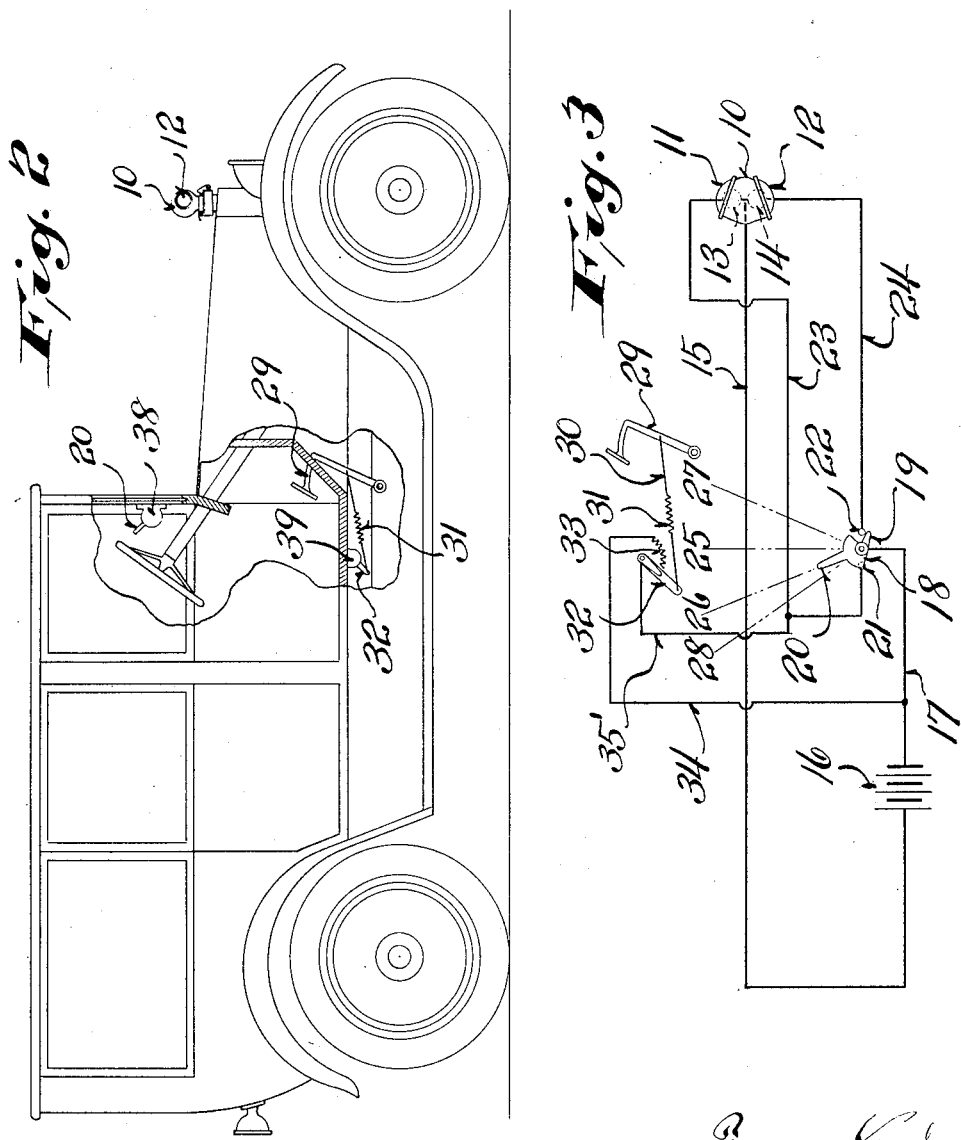

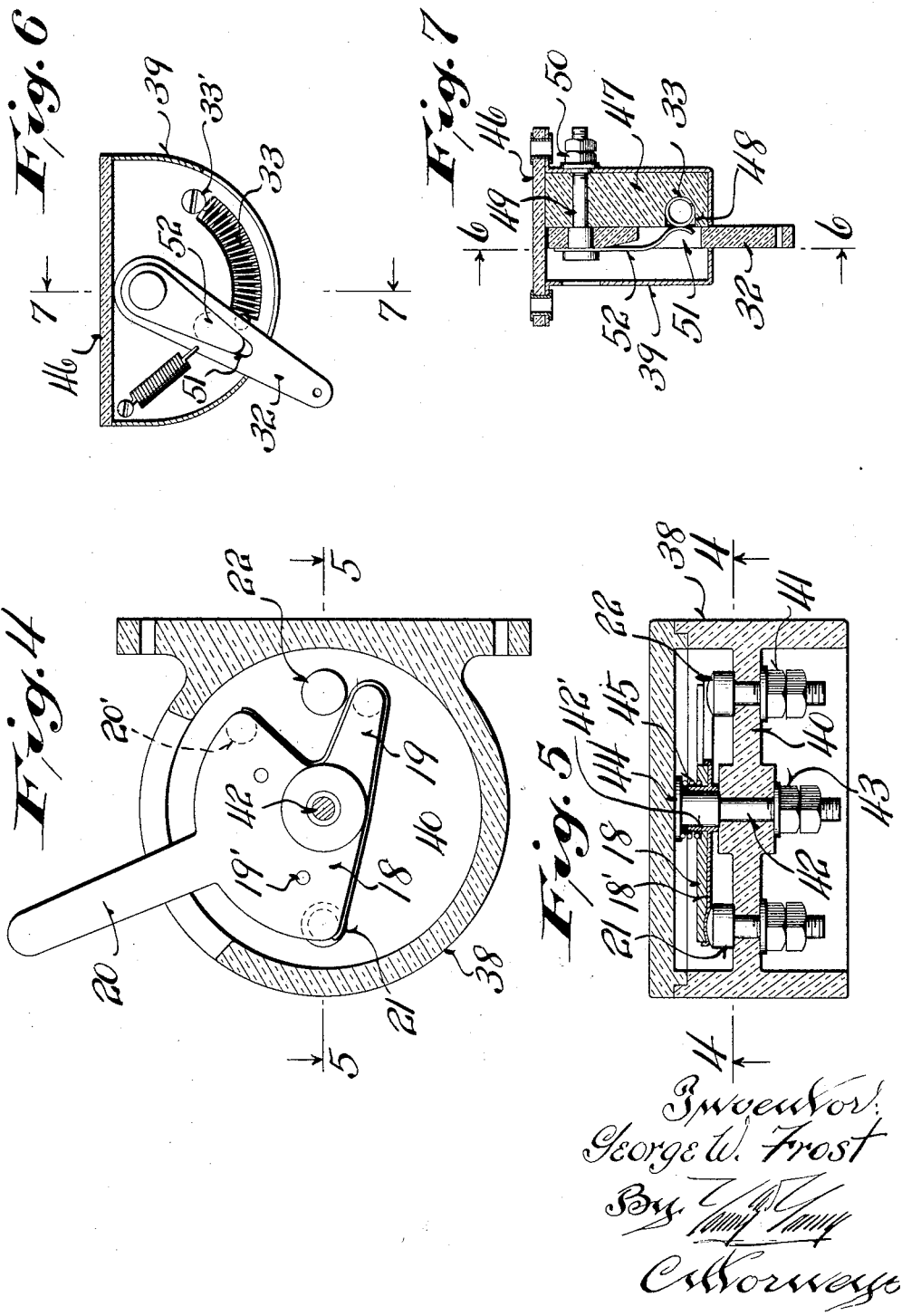

Patented Nov. 26, 1929

1,737,229

UNITED STATES PATENT OFFICE

GEORGE W. FROST, OF MILWAUKEE, WISCONSIN

SWITCH FOR SYSTEMS OF AUTOMOTIVE SAFETY SIGNALING

Application filed July 19, 1926. Serial No. 123,391.

This invention relates to a system of automotive safety signaling.

Objects of this invention are to provide a novel system of signaling for automobiles, which will apprize the approaching driver of the direction in which the automobile is to be turned prior to the arrival at the center of crossing, and which is so constructed that the signals may be set to indicate a straight ahead course or a full stop.

A further object of this invention is to provide a novel form of rear signal which will be illuminated in proportion to the degree of pressure exerted by the brakes, so that the driver of a following car will be warned of the change of the rate of travel of the car ahead, the signal being fully and brilliantly illuminated when a full stop is to be made.

Further objects are to provide a novel form of signal for automobiles, which is so constructed that a colored spotlight is projected on opposite sides of the car downwardly upon the roadway and upon the front portion of the front fenders, and to so arrange the colors that the direction of turn is indicated. For example, in the system hereinafter described in detail, a red spotlight is used for a left turn, and a green spotlight for a right turn, both spotlights being lighted when the car is to travel straight ahead.

Further objects are to provide a novel form of signal for automobiles which is so constructed that the colored spotlight is projected downwardly, forwardly, and laterally, to warn not only approaching automobiles, but also pedestrians, so that there can be no doubt whatsoever as to the intention of the driver.

Further objects are to provide a novel form of spotlight which may be illuminated and projected downwardly upon the roadway so that the spotlight approximately covers the center of the roadway on the average highway, and thus acts as a gauge for passing cars.

Further objects are to provide a novel form of signal in which no glare is produced, but instead, the roadway itself is used for the illuminated area, instead of projecting the rays into the eyes of the approaching driver, and in which the signal is visible from both sides of the car, from the front and from the rear.

Further objects are to provide a novel form of signaling system for automobiles in which front spotlights are employed and are thrown downwardly upon the roadway so that the effect, instead of being diminished by rain, is in reality, enhanced, as the wet roadway acts as a more perfect reflector and, consequently, reflects a greater portion of the signal light.

Further objects are to provide a novel form of signal for automobiles which is so constructed that one of the front signals, for example, a red signal, is gradually illuminated simultaneously as the brake is applied so that the front signal glows faintly when a light pressure of the brake is applied, and its brilliancy increases as the pressure of the brake increases.

A further object is to provide a novel form of front signal for automobiles in which a right hand green spotlight used as a signal light can also be used as a ditch light.

An embodiment of the invention is shown in the accompanying drawings in which:

Figure 2 is a side elevation of an automobile equipped with the signaling system, parts of the automobile being broken away;

Figure 3 is a diagrammatic view showing the wiring system;

Figure 4 is an enlarged sectional view through the signaling switch, such view corresponding to a section on the line 4—4 of Figure 5;

Figure 5 is a sectional view on the line 5—5 of Figure 4;

Figure 6 is a sectional view through the brake switch, such view corresponding to a section on the line 6—6 of Figure 7;

Figure 7 is a sectional view on the line 7—7 of Figure 6.

Figure 1:
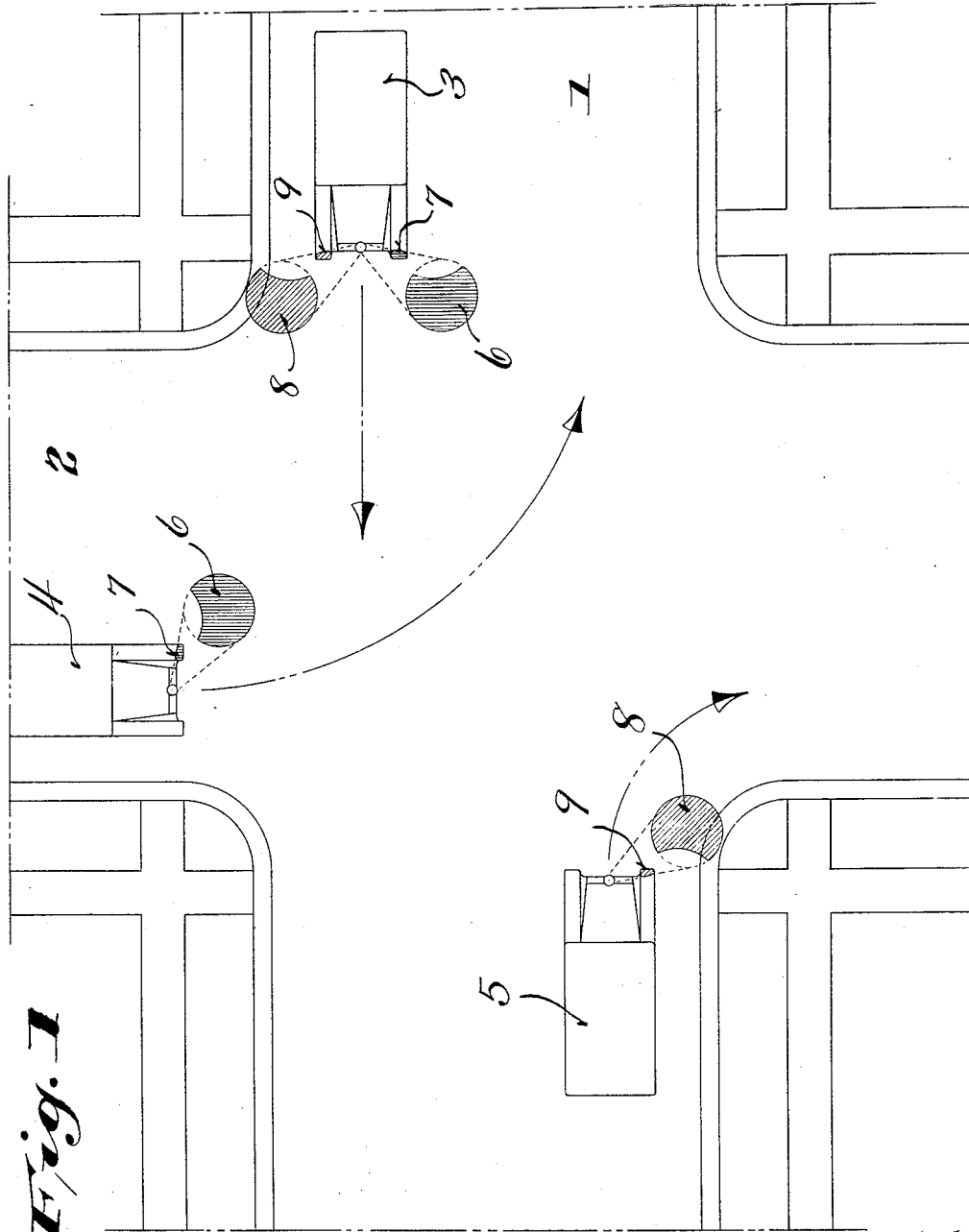
Figure 1 is a plan view illustrating a street crossing, with automobiles approaching the crossing and with certain signals illuminated.

Referring first to Figure 1, it will be seen that streets 1 and 2 have been illustrated as crossing each other, and automobiles indicated by the reference characters 3, 4, and 5, are indicated as approaching the center of the crossing.

The driver of the automobile, indicated by the reference character 4, intends making a left turn, as indicated by the arrow. He, therefore, lights the left hand red spotlight and projects a red light in the form of a crescent or approximate circle upon the roadway. Further, this light illuminates the front left hand fender with a red patch, as indicated at 7 in Figure 1.

The driver of automobile No. 3 intends to go straight ahead, as indicated by the arrow, and consequently lights both spotlights, thus throwing the red light 6, and the green light 8 downwardly upon the roadway and correspondingly illuminating the front left hand fender, as indicated at 7 with a red patch, and the front right hand fender with a green patch, as indicated by the reference character 9.

The driver of automobile No. 5 intends to make a right turn and, consequently, lights the green right hand spotlight and projects the green light 8 downwardly upon the roadway, and correspondingly illuminates the front edge of the right fender, as indicated at 9. Each of these signals is set prior to arrival at the center or crossing and, consequently, indicates the intention of the driver to the approaching drivers so that no confusion can result.

It is to be particularly noted that the patches of light or spots of light upon the roadway, indicated by the reference characters 6 and 8, are distinctive in color and in outline. Further, it is to be noted that the illumination of the front edges of the corresponding fenders also definitely marks the extreme outline of the car and aids in the indication of the driver's intention as to turning or traveling straight ahead.

From the outline of the operation of the system thus far given, it is apparent that the several cars, as they approach a crossing, are operated in a manner to indicate the intention of the respective drivers prior to the arrival at the center or crossing. Thus, there is no uncertainty as to the course to be followed by the several cars, and the net result is that a very smooth and easy control of traffic is secured by this system.

It is to be particularly noted that when cars are passing each other upon a highway, that the spotlights may be illuminated, and will thus project on the inner side of the car a light downwardly upon approximately the center line of the highway, and upon the front edge of the left fender so that the lights act as a gauge, and indicate the amount of clearance between the cars without in any manner blinding either of the drivers.

When it is considered that the cars, as normally operated, pass each other either with glaring headlights on the one hand, or else with suddenly dimmed headlights on the other, it is appreciated that in each of these cases, the eyes of the drivers are in a very poor condition to gauge the spacing between the cars with the requisite accuracy for certainty and safety. This invention, however, fulfills this long felt want to a remarkable degree, and effects the desired warning, and also indicates the clearance in a highly novel and practical manner without any additional strain on the eyes of the drivers and without any blinding whatsoever.

Referring to Figure 3, which indicates the wiring system, it will be seen that the front spotlight is indicated by the reference character 10 and consists of a double light, a red light being on the left hand side and secured by means of a red lens 11, and a green light being on the right hand side and secured by means of a green lens 12, both lenses being carried by the compound spotlight 10. Within the spotlight or main casing thereof, a pair of lamps 13 and 14 for the respective lenses 11 and 12 are positioned. These lamps have a common conductor 15 which extends to one side of the battery 16. Obviously, this conductor may be the frame of the machine, if desired. The other side of the battery is connected by means of the conductor 17 to the center of a signal switch 18, such switch being provided with an auxiliary arm 19, and with an operating handle 20. This switch cooperates with a pair of stationary contacts 21 and 22 which are connected by means of conductors 23 and 24 to the other side of the lamps 13 and 14 respectively.

Thus, when the switch is rocked to neutral position, as indicated by the center line 25, neither of the front lights is illuminated. However, when it is rocked to the position, indicated by the center line 26, the red light on the left hand side is illuminated; when rocked to the position indicated by the center line 27, the green light on the right hand side is illuminated, as the body of the switch 18 contacts with the appropriate stationary contact. When the switch is rocked to the position, indicated by the center line 28, both of the lamps are illuminated, as the body 18 of the switch contacts with the stationary contact 21, and as the auxiliary arm 19 contacts with the stationary contact 22.

Thus, by means of a single handle, either of the lights or both of the lights simultaneously, may be illuminated or else both lights may be extinguished.

An additional switch is provided which cooperates with the foot brake pedal 29, such pedal being connected to the switch by means of a cable 30, or other member, preferably equipped with a spring 31. This cable connects with the rocking arm 32 of the brake switch. The brake switch swings over a resistance 33, and gradually cuts out more and more of the resistance, as the brake is applied with greater and greater force. When the brake is off, the arm 32 is free of contact with the resistance and, consequently, the circuit through this switch is opened. The resistance is connected to the battery 16 by means of the conductor 34, which joins the conductor 17. The center or pivot point of the arm 32 is connected by means of the conductor 35' to the conductor 23. One end of the resistance 33 is connected by means of conductor 34 to conductor 17. It will be noted from this connection that as the brake is applied, the left hand or red signal lamp is gradually illuminated.

Thus, when the brake is applied in a light manner, only a small fraction of the resistance 33 is cut out and, consequently, the lamp 11 glows faintly. However, as a greater pressure is exerted by the brakes, more of the resistance is cut out and consequently, the lamp 11 is more brightly illuminated. When the brakes are set tight, as when making a full stop, the lamp 11 is brilliantly illuminated.

It is within the scope of this invention to associate either one or both of the front spotlights with this brake switch so that the operation of the brake switch will also permit the illumination of either one or both of the front spotlights.

Referring to Figure 2, the relative position of the switches is indicated. For example, the casing for the spotlight switch is indicated by the reference character 38, and the handle 20 thereof projects outwardly in an easily accessible position for the driver. For example, the casing of the switch may be mounted, as indicated in Figure 2, upon one of the uprights, preferably the left hand upright of the car.

The casing 39 for the foot switch is mounted preferably below the base of the car, and the arm 32 thereof is connected as previously described to the brake pedal 29.

It is, of course, to be understood that other positions may be chosen for these switches without departing from the spirit of the invention, but the locations indicated in Figure 2 are found satisfactory.

Referring to Figures 4 and 5, the details of the spotlight switch are indicated. This spotlight switch comprises a cylindrical casing 38, which is provided with a base, and which has an approximately centrally located web 40, which carries the stationary contacts 22 and 21. These contacts are, in reality, head bolts which pass through the web 40, and are locked in place by means of the nuts 41, such nuts also serving to receive the conductors. The main portion 18 of this switch is pivotally mounted upon a central pin 42, which is provided with a shoulder clamped in place by means of the nuts 43, such nuts also affording connection for the central conductor. The end of the pin is headed as indicated at 44, and a compression spring 45 is positioned between this head and the body portion 18 of the switch, as indicated in Figure 5. It is to be noted that a metal plate 18' is riveted to the body of the switch by means of rivets 19 and is provided with depressions or recesses 20' adapted to snap over the contact heads.

Further, this metal plate has two marginal edges upturned to facilitate riding over the heads of the stationary contacts. The metal plate is rigidly secured to a metal sleeve 42' which rides upon the central pin, as shown most clearly in Figure 5.

The casing 39 of the brake pedal switch is approximately semi-cylindrical, as shown in Figures 6 and 7. This casing is secured to a base 46 and houses an insulating block 47, such block being provided with an arcuate channel 48 within which the resistance element 33, preferably in the form of a spiral, is located. The arm 32 of the switch is pivotally carried by means of a pin 49, such pin being locked in place by means of nuts 50, which latter afford a means of connection for the central conductors. The arm 32 is cut out, as indicated at 51, and carries a spring finger 52 which extends through such cut out, and rides upon the resistance 33. It is to be noted from Figure 6 that the screw or bolt 33' forms one of the terminals of this switch.

It will be seen from the detailed description that the switches may be very cheaply constructed and will function in the manner described in detail above. Further, it will be seen that a very easy control of the several signal lights is afforded by this invention, and that the signal lights may be operated in the manner described in detail above to give an absolutely reliable signal of the intention of the driver prior to his arrival at the point of crossing, or prior to his passing an approaching car.

Further, it will be seen that the invention provides a signal system which may be easily installed upon existing cars with a minimum of effort.

It will be seen further that the apparatus is relatively simple and may be very cheaply manufactured.

Although the invention has been described in considerable detail, such description is intended as illustrative rather than limiting as the invention may be variously embodied and as the scope of such invention is to be determined as claimed.

I claim:

In a signaling system device, a switch member including a cylinder casing, a central web in the casing, having openings therethrough, a pair of contacts carried by the web and arranged upon opposite sides of the center thereof, a central pin carried by the web having a headed portion at one end, removable nuts on the other end, a metal sleeve on the pin beneath the headed portion, a metal contact plate carried by the sleeve, an insulated switch plate carried by the metal plate, said metal plate having depressions therein for engagement with the contacts, a spring on the pin normally urging the metal plate toward the contacts, an auxiliary arm on the switch plate and metal plates for engagement with one of the contacts and a laterally projecting handle on the switch plate extending through one side of the casing and adapted to be actuated for moving the depressions and auxiliary arm into and out of engagement with the contacts.

In testimony that I claim the foregoing I have hereunto set my hand at Milwaukee, in the county of Milwaukee and State of Wisconsin.

GEORGE W. FROST.